April 19, 1949.  J. W. MEGARGEE  2,467,682
CONVEYER
Filed Dec. 13, 1944
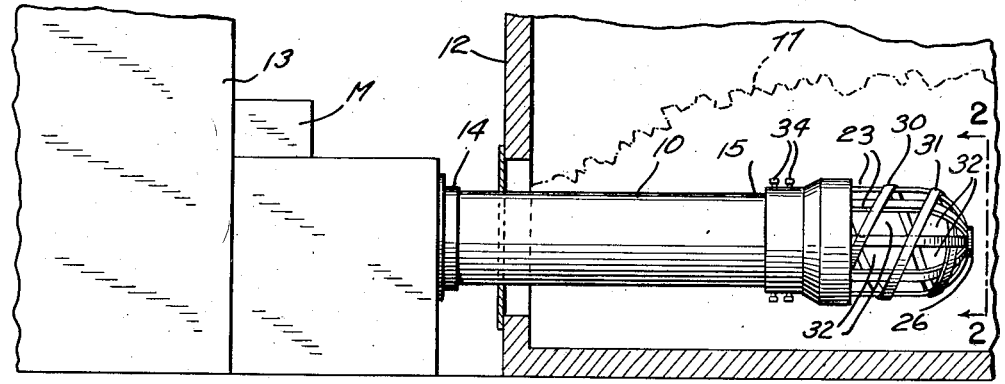
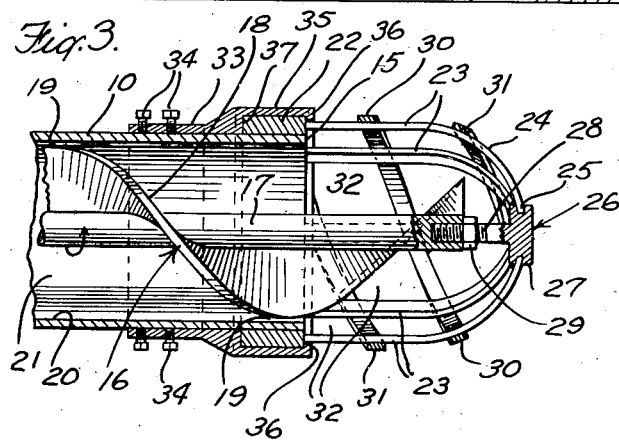
INVENTOR
JOSEPH WILFRID MEGARGEE
BY
Francis Wentworth Jr.
ATTORNEY Patented Apr. 19, 1949

2,467,682

UNITED STATES PATENT OFFICE 2,467,682

CONVEYER

Joseph Wilfrid Megargee, Brooklyn, N. Y.

Application December 13, 1944, Serial No. 567,927

8 Claims. (Cl. 198—213)

This invention relates to conveyors and more particularly to continuously operable conveyors wherein material is conveyed through a conduit from a source of use by a conveyor.

It is usual in apparatus of the type to which this invention relates to feed material to a helical feed screw which revolves within a conduit, there being sufficient clearance between the outer peripheral surface of the feed screw blade and the inner surface of the conduit to permit the screw conveyor to revolve within the conduit. Occasionally, hard pieces of oversized material or foreign substance are fed to the conveyor, which pieces are too large to be readily passed through the conduit by the screw. Such material becomes jammed between the blade of the screw conveyor and the inner wall of the conduit and causes the conveyor to become inoperative.

The present invention provides a guard device which prevents pieces of substance of a size too large to be readily passed through the conveyor conduit from entering said conduit. The invention also provides a guard device which feeds material toward and into the conveyor and removes oversized substance from the path of material being fed to the conveyor.

The invention will be understood from the following description when considered in connection with the accompanying drawing forming a part thereof and in which:

Fig. 1 is a side elevational view illustrating the device of the present invention used in conjunction with a conveyor for conveying coal to a furnace;

Fig. 2 is an enlarged end view taken on the line 2—2 of Fig. 1;

Fig. 3 is a longitudinal sectional view taken on the line 3—3 of Fig. 2, and

Fig. 4 is a view similar to Fig. 3 but of another embodiment of the invention.

Like characters of reference refer to like parts throughout the views.

Referring to the form of the invention shown in Figs. 1 to 3, the reference character 10 designates a conduit through which coal 11 is fed from a bin 12 to a furnace 13. As shown, the conduit 10 is mounted adjacent its outlet end 14 on a portion of the furnace 13 while the inlet end 15 of the conduit extends into the bin 12. A screw conveyor 16 is disposed in the conduit 10 and is of such a diameter that it will readily revolve within the conduit. As shown more particularly in Fig. 3, the screw conveyor 16 comprises a shaft 17 having a helical blade 18, the blade 18 being of a diameter to provide a slight clearance 19 between the outer diameter of the blade and the inner wall 20 of the conduit so that the conveyor 16 will revolve in the conduit. Blade 18 provides a helical path 21 through the conduit 10 and is so pitched that when it is revolved in one direction the material will be conveyed from the inlet end 15 toward the outlet end 14. The screw conveyor 16 projects beyond the inlet end 15 of the conduit. Conveyor 16 is revolved by any desirable means. For example, a motor M positioned adjacent the outlet end 14 of the conduit 10 may be used to revolve the conveyor shaft 17 through suitable driving means such as gears, pulleys or other means not shown.

The guard device of the present invention encloses the end of the conveyor 16 which projects beyond the inlet end of the conduit. In the embodiment of the invention disclosed in Figs. 1 to 3, the guard comprises an annular member 22 adapted to slidably bear on the outer surface of the conduit 10. Longitudinally extending strips 23 are secured to the member 22 in spaced relationship circumferentially of said member and project axially from the member 22 a distance greater than the distance which the screw conveyor 16 projects beyond the inlet end of the conduit 10. The strips 23 are curved at 24 so that the ends 25 thereof may be fixedly mounted in the head 27 of a fastening member 26 which head, as shown, is of lesser diameter than the annular member 22. The fastening member 26 has a screw-threaded shank 28 projecting from the head 27 toward the member 22. The screw-threads on the shank 28 are adapted to engage screw-threads in the projecting end of the shaft 17. A lock nut 29 will lock the shank in relationship to the shaft so that the shank revolves with said shaft. Circumferentially extending strips 30 and 31 are secured to the outer side of the longitudinally extending strips 23. As shown in Figs. 1 to 3, the strips 30 and 31 are spiralled on the longitudinally extending strips 23 in spaced relationship so that the adjacent convolutions of the strip 30 and strip 31 are substantially parallel and are spaced from one another to form interstices 32 between adjacent convolutions of the strips 30 and 31 and adjacent strips 23. Strips 30 and 31 are secured in position on the strips 23 in any desired manner. The strips 30 and 31 and strips 23 are so spaced in relationship to each other that the interstices 32 are of such a dimension as to permit only pieces of substance of a size which may readily be conveyed through the conduit 10 from being fed into the conduit by the projecting end of the screw conveyor 16. Oversize pieces of material or foreign substance, that is, pieces too large to be passed through the conduit 10, are, therefore, prevented from entering the conduit. The spiralled strips 30 and 31 are so pitched that when the conveyor shaft 17 is revolved to feed material toward the outlet end of the conduit 10, the strips 30 and 31, since they are on the outer side of the longitudinal strips 23, will agitate the coal or other material 11, move it toward the inlet end of the conduit and into contact with the projecting end of the screw conveyor through the interstices. The guard device of the present invention is revolubly held in position on the housing 10 by a securing member 33 fastened to the housing by set screws 34. Member 33 has a portion 35 spaced from the outer periphery of the conduit and which slidably engages the outer surface of the annular member 22, said portion 35 having a projecting rim 36 to provide a groove in which the member 22 revolves but is held against axial movement.

In operation, the guard of the present invention is positioned on the inlet end 15 of the conduit 10 by securing the shank 28 in the shaft 17 of the conveyor by means of the screw-threads thereon and the lock nut 29. The member 33 is then fastened in position by the set screws 34. When the screw conveyor 16 is revolved in a direction to feed material from the inlet end 15 thereof toward the outlet end 14, such material as it passes through the interstices 32 is conveyed into and through the spiral path formed in conduit 10 by the blade 18 of the screw conveyor. Since the strips 30 and 31 and strips 23 are so spaced in relationship to each other that the interstices 32 are of a dimension to permit only pieces of substance of a size which may readily be conveyed through the helical path 21 in the conduit to enter said conduit, clogging or jamming of the conduit by oversized material or oversized foreign substance is prevented. The strips 23, 30 and 31 serve to agitate the material surrounding the guard, as shown in Fig. 1, the spiralled strips 30 and 31 causing the material to be moved toward the inlet end 15 of the conduit, and into engagement with the projecting end of the screw conveyor through the interstices 32. Any substance too large to pass through the interstices is moved by the spiralled strips 30 and 31 longitudinally of and away from the guard thereby preventing clogging or blocking of the guard by oversized pieces. As shown, the oversized substance would be moved toward the conduit 10 on the outside of the guard.

In the form of the invention shown in Fig. 4 of the drawing, the guard comprises longitudinally extending strips 38 secured at one end to an annular member 39 in spaced relationship circumferentially of the member 39 which strips project beyond the end of the conduit a distance greater than the distance which the screw conveyor 16 projects beyond the inlet end of the conduit 10. The opposite ends of the strips 38 are secured to a circular plate 40 of substantially the same diameter as the member 39. The plate 40 has a hub 41 secured to a journal 42 on the shaft 17 by screws 43 so that the plate 40 revolves with the shaft 17 and, in turn, through the strips 38, causes the member 39 to rotate. The plate 40 has an axle 44 mounted in a bearing 45 in an upright stand 46. Circumferential strips or bands 47 are secured to the outer side of the strips 38 and are axially spaced from one another. The strips 38 and the strips 47 are so spaced in relationship to each other as to form substantially rectangular shaped interstices 49 through which material must pass to reach the conveyor screw 16. The interstices 49 are of such size as to permit only pieces to pass therethrough of a dimension which may be readily conveyed through the helical path 21 in the conduit 10 and prevent pieces too large to be conveyed through the helical path from entering the conduit. Axial movement of the guard is prevented by screws 50 in the member 39 which screws project into and move in a circular path in a guideway 51 in a sleeve 52. The sleeve 52 is secured against rotation on the conduit 10 by set screws 53.

In operation, the guard of the embodiment of the invention shown in Fig. 4 revolves with the shaft 17 of the conveyor 16, and as in the form of the invention shown in Fig. 1 to 3, prevents pieces of material or foreign substance too large to be conveyed through the conduit 10 from entering the helical path in the conduit formed by the screw conveyor 16.

While the invention has been disclosed as used in the conveyance of coal, it will be understood that the present invention is capable of use in the conveyance of material other than coal.

Since changes may be effected in the forms of the invention selected for disclosure without departing from the principles of the invention, it will be understood that the invention is not to be limited except by the scope of the appended claims.

What is claimed is:

1. Conveying apparatus comprising a conduit, a screw conveyor revoluble in the conduit for conveying material therethrough, said conveyor extending outwardly of the conduit beyond the inlet end thereof, and a guard asociated with the conduit at the inlet end thereof, the guard being constructed and arranged to enclose said inlet end and surround the portion of the conveyor extending therebeyond, said guard only having openings therethrough of a size no greater than the size of the largest material which can be conveyed through the conduit, and means connecting the guard and the projecting end of the screw conveyor so that said guard is revolved by the conveyor.

2. Conveying apparatus comprising a conduit having an inlet end, a screw conveyor revoluble in the conduit for conveying material therethrough, a guard projecting outwardly from the inlet end of the conduit, the guard being constructed and arranged to enclose said inlet end, said guard only having openings therethrough of a size no greater than the size of the largest material which can be conveyed through the conduit, means connecting the guard to the screw conveyor so that the guard is revolved by the conveyor, and means on the outer surface of the guard forming helical projections on said outer surface, the projections being pitched so that when the conveyor is revolved to feed material through the conduit material engaging said projections is caused to move longitudinally of the guard.

3. A guard for conveying apparatus having a conduit with a revoluble screw conveyor therein for conveying material therethrough, which conveyor projects beyond the inlet end of the conduit, the guard being constructed and arranged to enclose said inlet end and surround the portion of the conveyor extending therebeyond, said guard only having openings therethrough of a size no greater than the size of the largest material which can be conveyed through the conduit, connecting means associated with the guard and adapted to connect the guard with said projecting end of the screw conveyor so that the guard is revolved by the conveyor, and means on the outer surface of the guard forming helical projections on said outer surface of the guard, said projections being pitched so that when the conveyor is revolved to feed material through the conduit, material engaging said projections is caused to move longitudinally of the guard.

4. A guard for conveying apparatus having a conduit with a revoluble screw conveyor therein for conveying material therethrough, which conveyor projects beyond the inlet end of the conduit, the guard being constructed and arranged to enclose said inlet end and surround the portion of the conveyor extending therebeyond, said guard comprising a plurality of longitudinally extending strips annularly spaced from one another to form an enclosure for said projecting portion of said conveyor, spaced strips extending circumferentially of said enclosure and mounted on the longitudinally extending strips, said longitudinally extending strips being so spaced from each other and said circumferentially extending strips being so spaced from one another as to form openings therebetween of a size no greater than the size of the largest material which can be conveyed through the conduit so that only material of a size which can be conveyed in the conduit can pass through the openings and into the enclosure, and means for securing said guard to the revoluble screw conveyor to revolve therewith.

5. A guard for conveying apparatus having a conduit with a revoluble screw conveyor therein for conveying material therethrough, which conveyor projects beyond the inlet end of the conduit, the guard being constructed and arranged to enclose said inlet end and surround the portion of the conveyor extending therebeyond, said guard comprising a plurality of longitudinally extending strips annularly spaced from one another to form an enclosure for said projecting portion of the conveyor, strips extending circumferentially and helically of said enclosure and mounted on the longitudinally extending strips outwardly of said enclosure, said longitudinally extending strips being so spaced from each other and said circumferentially extending strips being so spaced from one another as to form openings therebetween of a size no greater than the size of the largest material which can be conveyed through the conduit so that only material of a size which can be conveyed in the conduit can pass through the openings and into the enclosure, and means for securing said guard to the revoluble screw conveyor to revolve therewith.

6. A guard for conveying apparatus having a conduit with a revoluble screw conveyor therein for conveying material therethrough, which conveyor projects beyond the inlet end of the conduit, said guard comprising a plurality of longitudinally extending strips annularly spaced from one another to form an enclosure for said projecting portion of the conveyor screw, spaced strips extending circumferentially of said enclosure and mounted on the longitudinally extending strips, said longitudinally extending strips being so spaced from each other and said circumferentially extending strips being so spaced from one another as to form openings therebetween of a size no greater than the size of the largest material which can be conveyed through the conduit, end members adjacent the opposite ends of said longitudinally extending strips to which said strips are secured, the members being constructed to prevent the passage of said material therethrough into said enclosure, one end member revolubly engaging said conduit, and means for securing the end member opposite said one member to said conveyor screw to revolve therewith.

7. A guard for conveying apparatus having a conduit with a revoluble screw conveyor therein for conveying material therethrough, which conveyor projects beyond the inlet end of the conduit, said guard comprising a plurality of longitudinally extending strips annularly spaced from one another to form an enclosure for said projecting portion of the conveyor screw, spaced strips extending circumferentially of said enclosure and mounted on the longitudinally extending strips, said longitudinally extending strips being so spaced from each other and said circumferentially extending strips being so spaced from one another as to form openings therebetween of a size no greater than the size of the largest material which can be conveyed through the conduit, annular end members adjacent the opposite ends of said longitudinally extending strips to which said strips are secured, the members being constructed to prevent the passage of said material therethrough into said enclosure, one end member being revolubly associated with said conduit and of a diameter greater than the diameter of the conduit and the opposite end member being of a lesser diameter than said one end member, and means for securing the end member opposite said one member to said conveyor screw to revolve therewith.

8. A guard for conveying apparatus having a conduit with a revoluble screw conveyor therein for conveying material therethrough, which conveyor projects beyond the inlet end of the conduit, said guard comprising a plurality of longitudinally extending strips annularly spaced from one another to form an enclosure for said projecting portion of the conveyor screw, annular strips spaced from each other and extending circumferentially of said enclosure and mounted on the longitudinally extending strips, said longitudinally extending strips being so spaced from each other and said circumferentially extending strips being so spaced from one another as to form rectangular-shaped openings therebetween of a size no greater than the size of the largest material which can be conveyed through the conduit, annular end members of substantially the same diameter disposed adjacent the opposite ends of said longitudinally extending strips to which said strips are secured, the members being constructed to prevent the passage of said material therethrough into said enclosure, one end member revolubly engaging said conduit and means for securing the end member opposite said one member to said conveyor screw to revolve therewith.

JOSEPH WILFRID MEGARGEE.

REFERENCES CITED

The following references are of record in the file of this patent:

UNITED STATES PATENTS

| Number | Name | Date |
| --- | --- | --- |
| 364,571 | Bowers | June 7, 1887 |
| 372,956 | Bowers | Nov. 8, 1887 |
| 682,024 | Bradley | Sept. 3, 1901 |
| 1,388,650 | Josephs | Aug. 23, 1921 |
| 1,401,994 | Lockley | Jan. 3, 1922 |
| 1,683,010 | Anderson | Sept. 4, 1928 |
| 1,966,325 | Welch | July 10, 1934 |
| 2,017,296 | Smith | Oct. 15, 1935 |
| 2,223,894 | Love | Dec. 3, 1940 |
| 2,361,404 | Kalix | Oct. 31, 1944 |
| 2,389,483 | Bobrowski et al. | Nov. 20, 1945 |